S. F. HALL.
REFRACTORY ARTICLE AND METHOD OF MAKING IT.
APPLICATION FILED DEC. 26, 1908.
1,030,999.
Patented July 2, 1912.
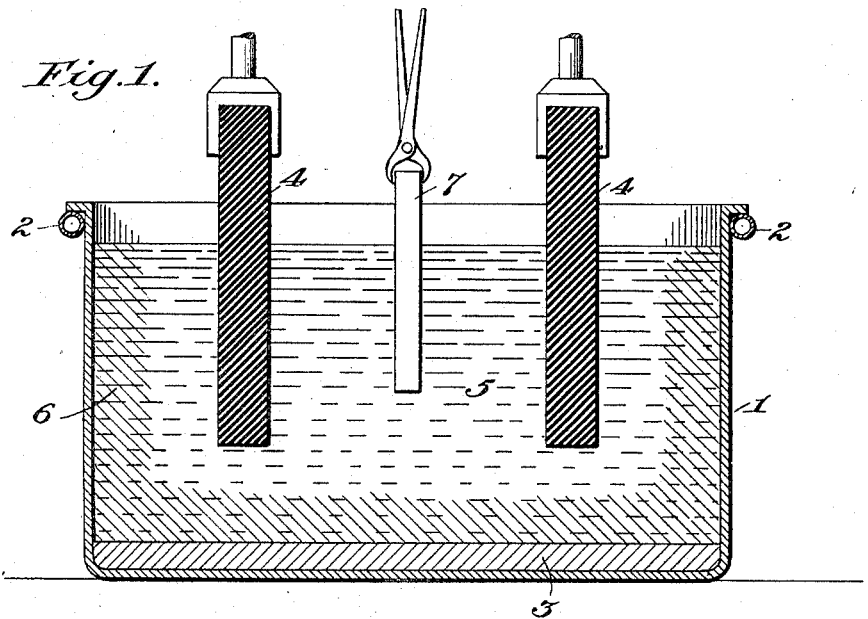
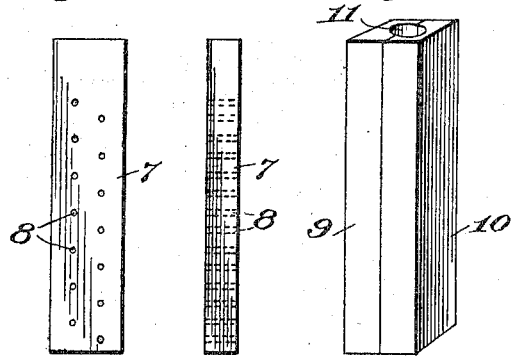
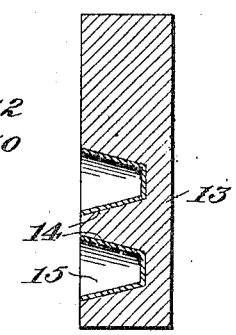

UNITED STATES PATENT OFFICE.

SAMUEL F. HALL, OF NIAGARA FALLS, NEW YORK, ASSIGNOR TO NORTON COMPANY, OF WORCESTER, MASSACHUSETTS, A CORPORATION OF MASSACHUSETTS.

REFRACTORY ARTICLE AND METHOD OF MAKING IT.

1,030,999.     Specification of Letters Patent.     Patented July 2, 1912.

Application filed December 26, 1908. Serial No. 469,325.

*To all whom it may concern:*

Be it known that I, SAMUEL F. HALL, a citizen of the United States, residing at Niagara Falls, in the county of Niagara and State of New York, have invented certain new and useful Improvements in Refractory Articles and Methods of Making Them, of which the following is a specification.

The object of this invention is the provision of a method of making articles from such refractory oxids, as for example alumina, as are fusible only at extremely high temperatures.

Attempts have heretofore been made to cast molten alumina or other refractory oxids or combinations of these in molds, but such efforts have not proved successful partly by reason of the difficulties encountered in tapping the molten product from the furnace or otherwise transferring it to the mold. According to the present invention articles consisting of such refractory oxids are produced by heating the oxid, for example alumina, to a state of quiet fusion in an electric furnace, then dipping or immersing in the fused mass a mold or form, usually of carbon or graphite, withdrawing the mold together with the adhering or contained oxid, and separating or detaching the solidified oxid from the mold. By proceeding in this manner I have found it practicable to produce a variety of articles, such as rods, tubes, vessels or the like, without flaws, cracks or objectionable irregularities, and, in the case of tubes or hollow articles, with any desired thickness of wall.

For a full understanding of my invention reference is made to the accompanying drawing, wherein—

Figure 1 is a vertical sectional view of a conventional form of electric furnace, indicating a preferred manner of forming the articles; Figs. 2, 3, are side elevations at right angles to each other of a mold for producing small rods of refractory oxids; Fig. 4 is a perspective view of a sectional tube mold; Fig. 5 is a transverse section of the same, showing the tube in place, and Fig. 6 is a vertical sectional view of a crucible mold.

In the drawings, I have illustrated an electric furnace having metal walls 1 adapted to be cooled by a spray of water from an encircling pipe 2, and a refractory hearth 3. 4—4 are carbon electrodes of opposite polarity depending into a mass of molten refractory oxid 5, for example alumina. The furnace walls are protected by a solid layer 6 of the material constituting the charge. I have indicated in this figure the manner of manipulating the mold 7.

The mold may be of carbon or graphite, the latter being preferred by reason of its high-heat conductivity and the ease with which it may be machined; or other materials, as refractory metals or metallic compounds may be used. Iron molds may successfully be employed. Certain forms of mold are indicated in Figs. 2–6, inclusive. Thus in Figs. 2, 3, I have shown a plate 7 having transverse perforations 8 adapted for the production of small rods of alumina. These perforations become filled with molten alumina or other molten oxid when the plate is dipped or immersed in a bath of the same. This oxid is almost instantly solidified by the transfer of heat to the mold, and shrinks slightly in solidifying so that the rods are readily removed.

Fig. 4 represents a tube mold comprising opposite channeled sections 9–10 assembled in any usual or desired manner, as by the use of dowels, tenons or the like. The assembled mold provides a cylindrical smooth-walled opening 11 traversing it from end to end. When this mold is dipped for a part or all of its length in the bath of molten oxid, its surfaces become coated with a solidified layer, the portion of the layer coating the interior walls constituting a smooth-walled and readily removable tube of refractory oxid as indicated at 12 in Fig. 5. The thickness of this layer depends upon the quantity of heat transferred to the mold, and therefore upon the heat capacity of the mold and the duration of its immersion; it follows that for a given mold the thickness of the tube-wall depends upon the duration of the immersion, and thick- or thin-walled tubes may be produced at will. Obviously, the thickness of the wall may be increased as desired by repeated dipping. By making the refractory tube or other article on the internal wall of the mold without using a core, liability to fracture on cooling is avoided, and the normal shrinkage of the oxid serves to loosen or detach the article.

Fig. 6 illustrates a mold consisting of a plate or bar 13 having one or more crucible-shaped cavities 14, the crucible being formed, without the use of a core, of the solidified layer of refractory oxid 15 as before. Obviously a wide variety of forms may be made in this manner. The molds are preferably heated before dipping, as this results in a smoother and more uniform deposit.

I have observed that articles produced as above described may exhibit contrasting colors or shades, being dark colored or black on the side which was in contact with the mold, and in case of rods, pins, or the like, throughout their mass; while tubes, crucibles and other hollow articles are usually much lighter in color at and near their inner faces. This color variation is presumably due to the state or degree of oxidation of the material of the article, including the impurities usually contained therein. In the dark colored portions such impurities as iron, silicon and titanium, and even a portion of the aluminum, may exist in the form of carbids or other products of reduction, whereas in the lighter portions of the article these metals exist wholly or largely as oxidized compounds. I have further found that a relatively light color may be imparted to the whole mass of the article by firing the same under oxidizing conditions.

I claim:—

1. The method of making articles of refractory oxids, which consists in melting said oxids in an electric furnace, dipping a mold into the molten mass, withdrawing the mold together with the adhering layer of solidified oxid, and separating the article from the mold.

2. The method of making articles of refractory oxids, which consists in melting said oxids in an electric furnace, dipping into the molten mass a mold having an internal surface corresponding to the external surface of the desired article, withdrawing the mold together with the adherring layer of solidified oxid, and separating the article from the mold.

3. The method of making articles of aluminous material, which consists in melting an aluminous material in an electric furnace, dipping a mold into the molten mass, withdrawing the mold together with the adhering layer of solidified oxid, and separating the article from the mold.

4. The method of making articles of aluminous material, which consists in melting an aluminous material in an electric furnace, dipping into the molten mass a mold having an internal surface of graphite corresponding to the external surface of the desired article, withdrawing the mold together with the adhering layer of solidified oxid, and separating the article from the mold.

5. The method of making articles of refractory oxids, which consists in melting said oxids in an electric furnace, dipping a carbon or graphite mold into the molten mass, withdrawing the mold together with the adhering layer of solidified oxid, separating the article from the mold, and finally heating the article under oxidizing conditions.

6. An article consisting essentially of an aluminous material produced in a carbon or graphite mold and characterized by a discoloration or blackening of the body of the article at and near its surface of contact with the mold.

In testimony whereof, I affix my signature in presence of two witnesses.

SAMUEL F. HALL.

Witnesses:
CARL E. TUCKER,
KATHRYN CALDWELL.